US 6,237,339 B1

(12) United States Patent
Åsen et al.

(10) Patent No.: US 6,237,339 B1
(45) Date of Patent: May 29, 2001

(54) PROCESS FOR GENERATING POWER AND/OR HEAT COMPRISING A MIXED CONDUCTING MEMBRANE REACTOR

(75) Inventors: Knut Ingvar Åsen, Heistad; Erik Sandvold, Porsgrunn; Petter Inge Longva, Jar, all of (NO)

(73) Assignee: Norsk Hydro Asa, Oslo (NO)

( * ) Notice: Subject to any disclaimer, the term of this patent is extended or adjusted under 35 U.S.C. 154(b) by 0 days.

(21) Appl. No.: 09/424,955

(22) PCT Filed: Jul. 2, 1997

(86) PCT No.: PCT/NO97/00171
§ 371 Date: Jan. 13, 2000
§ 102(e) Date: Jan. 13, 2000

(87) PCT Pub. No.: WO98/55394
PCT Pub. Date: Dec. 10, 1998

(30) Foreign Application Priority Data

Jun. 6, 1997 (NO) .................................................... 972631

(51) Int. Cl.$^7$ .................................................... F01K 25/06
(52) U.S. Cl. ................................ 60/649; 60/651; 60/671
(58) Field of Search ............................... 60/648, 649, 651, 60/671

(56) References Cited

U.S. PATENT DOCUMENTS

| | | | |
|---|---|---|---|
| 5,007,240 | * 4/1991 | Ishida et al. | 60/649 X |
| 5,040,370 | * 8/1991 | Rathbone | 60/648 |
| 5,356,728 | 10/1994 | Balachandran et al. | 429/8 |
| 5,405,503 | * 4/1995 | Simpson et al. | 60/648 X |
| 5,573,737 | 11/1996 | Balachandran et al. | 422/211 |
| 5,599,510 | 2/1997 | Kaminsky et al. | 422/197 |
| 5,617,715 | 4/1997 | Beer et al. | 60/39.02 |
| 5,806,316 | * 9/1998 | Avakov et al. | 60/649 |

FOREIGN PATENT DOCUMENTS

| | | |
|---|---|---|
| 0211523 | 2/1987 | (EP) . |
| 0 399 833 | 11/1990 | (EP) . |
| 0399833 | 11/1990 | (EP) . |
| 0 438 902 | 7/1991 | (EP) . |
| 0 658 366 | 6/1995 | (EP) . |
| 0 658 367 | 6/1995 | (EP) . |
| 0658367 | 6/1995 | (EP) . |
| 0778069 | 6/1997 | (EP) . |
| 97/07329 | 2/1997 | (WO) . |
| 97/41060 | 11/1997 | (WO) . |

* cited by examiner

Primary Examiner—Hoang Nguyen
(74) Attorney, Agent, or Firm—Wenderoth, Lind & Ponack, L.L.P.

(57) ABSTRACT

The present invention relates to a process for generation of heat and/or power comprising a membrane reactor where a fuel is oxidized and further comprising an improved method for reducing emissions of carbon dioxide and emission of oxides of nitrogen from said process. There is applied a membrane reactor being a mixed oxygen ion and electron conducting membrane reactor comprising a first surface (feed side) capable of reducing oxygen to oxygen ions and a second surface (oxidation side) capable of reacting oxygen ions with a carbon containing fuel. The carbon containing fuel is mixed with recycled $CO_2$ and $H_2O$ containing exhaust gas before being supplied to the oxidation side of the membrane reactor. The air is heated before being supplied to the feed side of the membrane reactor at about atmospheric pressure. The $CO_2$ containing gas mixture from the process can be injected in an oil and gas reservoir for enhanced oil recovery or to a geological formation.

13 Claims, 2 Drawing Sheets

PROCESS FOR GENERATING POWER AND/ OR HEAT COMPRISING A MIXED CONDUCTING MEMBRANE REACTOR

This application is a 371 of PCT/NO97/00171 filed Jul. 2, 1997.

The present invention relates to a process for generating heat and/or power comprising a membrane reactor where a fuel is oxidised and further comprising an improved method for reducing emission of carbon dioxide and emission of oxides of nitrogen from said process.

Due to the environmental aspects of $CO_2$ and $NO_x$ and taxes on the emissions to the national authorities the possibilities for reducing the emissions of these compounds to the atmosphere from combustion processes, in particular from flue gas from gas turbines offshore, has been widely discussed.

Conventional combustion processes, used for carbon containing fuels and where the oxygen source is air, produce carbon dioxide concentrations of 3–15% in the exhaust gas dependent on the fuel and the applied combustion—and heat recovery process. The reason the concentration is this low is because air is made up of about 78% by volume of nitrogen.

Thus, a reduction in the emission of carbon dioxide makes it necessary to separate the carbon dioxide from the exhaust gas, or raise the concentration to levels suitable for use in different processes or for injection and deposition.

$CO_2$ can be removed from exhaust gas by means of several separation processes e.g. chemical active separation processes, physical absorption processes, adsorption by molecular sieves, membrane separation and cryogenic techniques. Chemical absorption by means of alkanole amines is considered as the most practical and economical method to separate $CO_2$ from power plant exhaust gas.

But this method does require heavy and voluminous equipment and will reduce the power output by about 10% or more. These known methods are however considered as not being very suited to practical implementation in a power generation process. In e.g. natural gas based power plants the fuel cost comprises a substantial part of the total cost of electric power. A high efficiency is therefore very important in order to reduce the cost of electric power.

In the mono ethanol ammine (MEA) process $CO_2$ from the cooled power plant exhaust gas reacts with aqueous solution of MEA in an absorption tower. Most of the $CO_2$ is thus removed from the exhaust gas that is released to the atmosphere. MEA will be degraded and e.g. a 350 MW combined cycle power plant will produce about 4000 tons MEA degration products per year which has to be destroyed or stored.

In order to meet national $NO_x$ control requirements different methods can be used for instance burner modifications, applications of catalytic bumers, steam additions or selective catalytic reduction (SCR) of the NOx in the exhaust gas. When air is used in combustion processes some of the nitrogen will be oxidised during the combustion to NO, $NO_2$ and $N_2O$ (referred to as thermal $NO_x$). At least 80–98% of the $NO_x$ formed arises from the said oxidation of nitrogen in air. The rest arises from oxidation of the nitrogen content in the fuel.

A method to both increase the concentration of $CO_2$ in an exhaust gas and to reduce the $NO_x$ formation is to add pure oxygen to the combustion process instead of air.

However, commercial air separation methods (cryogenic separation and PSA) will require 250 to 300 KWh/ton oxygen produced. Supplying oxygen e.g. to a gas turbine by this method will decrease the net power output of the gas turbine cycle by at least 20%. The cost of producing oxygen in a cryogenic unit will increase the cost of electric power substantially and may constitute as much as 50% of the cost of the electric power.

The main object of this invention was to arrive at a more efficient heat and power generating process comprising a combustion process which produce an exhaust gas with a high concentration of $CO_2$ and a low concentration of $NO_x$ that makes the exhaust gas stream suitable for direct use in different processes or for injection in a geological formation for long term deposition or for enhanced oil or natural gas recovery.

Another object of the invention was to supply oxygen to the combustion process which implies reduced energy demands compared to other known methods.

A further object was to utilise existing process streams in the power generation plant in obtaining improved oxygen supply to the combustion process.

The problem mentioned above concerning reduced fuel efficiency and high costs can partly be solved by application of mixed conducting membranes which is defined as a membrane made from material with both ion and electronic conductivity.

Such a membrane can be a mixed oxygen ion and electron conducting membrane, for instance capable of separating oxygen from oxygen-containing gaseous mixtures at 400–1300° C. An oxygen partial pressure difference causes oxygen ions to be transported through the membrane by reduction of oxygen on the high oxygen partial pressure side (feed side) and oxidation of the oxygen ions to gas on the low oxygen partial pressure side (the permeate side). In the bulk of the membrane oxygen ions are transported by a diffusive process. Simultaneously the electrons flow from the permeate side back to the feed side of the membrane.

The application of these membranes is a rather new technique and is generally known from the European patent application 0658 367 A2 which describe separation of oxygen from air by means of a mixed conducting membrane which is integrated with a gas turbine system. Pure oxygen near atmospheric pressure or below and at high temperature is recovered from the permeate side of the conducting membrane. This method, however, entails that the oxygen has to be cooled to below approximately 50° C. and recompressed to required process pressure before being added to the oxidation reactor or burner in a combustion process.

The inventors have applied a mixed oxygen ion and electron conducting membrane reactor, hereafter called a membrane reactor, to combine the supply of oxygen and burning of a fuel giving a hot gas mixture consisting of $CO_2$ and water and minor amounts of CO and $H_2$.

The principle of the electropox process as described in European patent application 0 438 902 A3 could be adopted for this membrane burner or the principle of the electrochemical reactor described in U.S. Pat. No. 5,356,728. Complete combustion of the fuel in the membrane burner is, probably, not possible. However, minor amounts of unconverted partially oxidised fuel in the $CO_2$-containing purge gas leaving the gas turbine process, can be oxidised separately in a small catalytic or non-catalytic combustion chamber by mixing the $CO_2$-containing purge gas with an oxygen-containing gas or pure oxygen. The $CO_2$-containing purge gas could also be injected to a geological formation without further treatment. If the $CO_2$-containing exhaust gas is applied for enhanced oil recovery the nearly zero oxygen content in the exhaust gas would be an advantage.

Further the inventors have used the recycled carbon dioxide or a mixture of carbon dioxide and water, e.g. part of the exhaust gas, from the combustion process as a coolant in the membrane reactor. Carbon deposition on the second surface (the oxidation side) can be avoided by properly selecting of catalyst material and by properly adjusting the ratio between fuel and recycled $CO_2$ and $H_2O$ containing exhaust gas. By applying the membrane reactor, oxygen could be recovered and reacted with a fuel without intermediate cooling and recompression of the oxygen as required in the European application 0658367. An additional advantage is that the operation pressure on the feed side of the membrane reactor can be lower or much lower than the operation pressure on the oxidation side of the membrane burner because the partial pressure of oxygen on the oxidation side will be less than about $10^{-15}$ bar due to the oxidation reactions. This implies that oxygen can be supplied to a high pressure oxidation process without a first compression of air and the result of that is increased efficiency of the power production. In a conventional gas turbine power generator the compression of oxygen consumed in the combustion process constitute about 6 to 10% of the total power output of the process.

Thus the inventors surprisingly found that their method has the advantage of supplying oxygen to the combustion process with no loss in the efficiency of the power and/or heat generating plant. More surprisingly the method could increase the efficiency of a gas turbine power generation process compared to conventional gas turbine processes and at the same time produce an exhaust gas with nearly zero NOx and with a high concentration of $CO_2$.

To obtain a sufficient high flux of oxygen through the membrane a rather high temperature is required (400–1300° C.). On the air side of the membrane this can be accomplished by using a burner to increase the temperature for instance as disclosed in European patent application 0658 367 A2. In order to avoid $CO_2$ in the air stream the air can be preheated by first heat exchanging with hot oxygen depleted air leaving the feed side of the membrane reactor and second in the membrane burner by heat exchanging with hot combusted fuel. The recycled $CO_2$ and $H_2O$ containing exhaust gas could be pre-heated in a recuperator and further preheated inside the membrane reactor.

Additional advantages of the improved heat and power generating process is reduced emissions of $NO_x$ due to the fact that very little nitrogen is present in the $CO_2$-based combustion system. This will also allow for development of improved and more efficient gas turbine or combustion systems since $NO_x$-control no longer is required. The higher specific heat capacity of $CO_2$ or a $CO_2/H_2O$-mixture than nitrogen will allow for development of more compact gas turbine systems and heat recovery systems, too.

A process for generation of heat and/or power comprising a membrane reactor where fuel is oxidised according to the present invention, comprises that there is applied a membrane reactor being a mixed oxygen ion and electron conducting membrane reactor comprising a first surface (feed side) capable of reducing oxygen to oxygen ions and a second surface (oxidation side) capable of reacting oxygen ions with a carbon containing fuel.

A special feature of the invention is that the carbon containing fuel is mixed with recycled $CO_2$ and $H_2O$ containing exhaust gas before being supplied to the oxidation side of the membrane reactor.

A further embodiment of the invention is that a gas mixture leaving the combustion process is fed to a heat and/or power recovery system and that the thus cooled $CO_2$ containing gas mixture is compressed for further injection in an oil and gas reservoir for enhanced oil recovery or is compressed for injection to an geological formation.

Another feature of the invention is that air is heated before being supplied to the feed side of the membrane reactor at about atmospheric pressure.

The invention will be further explained and envisaged in the examples and corresponding figures.

Figure 1:
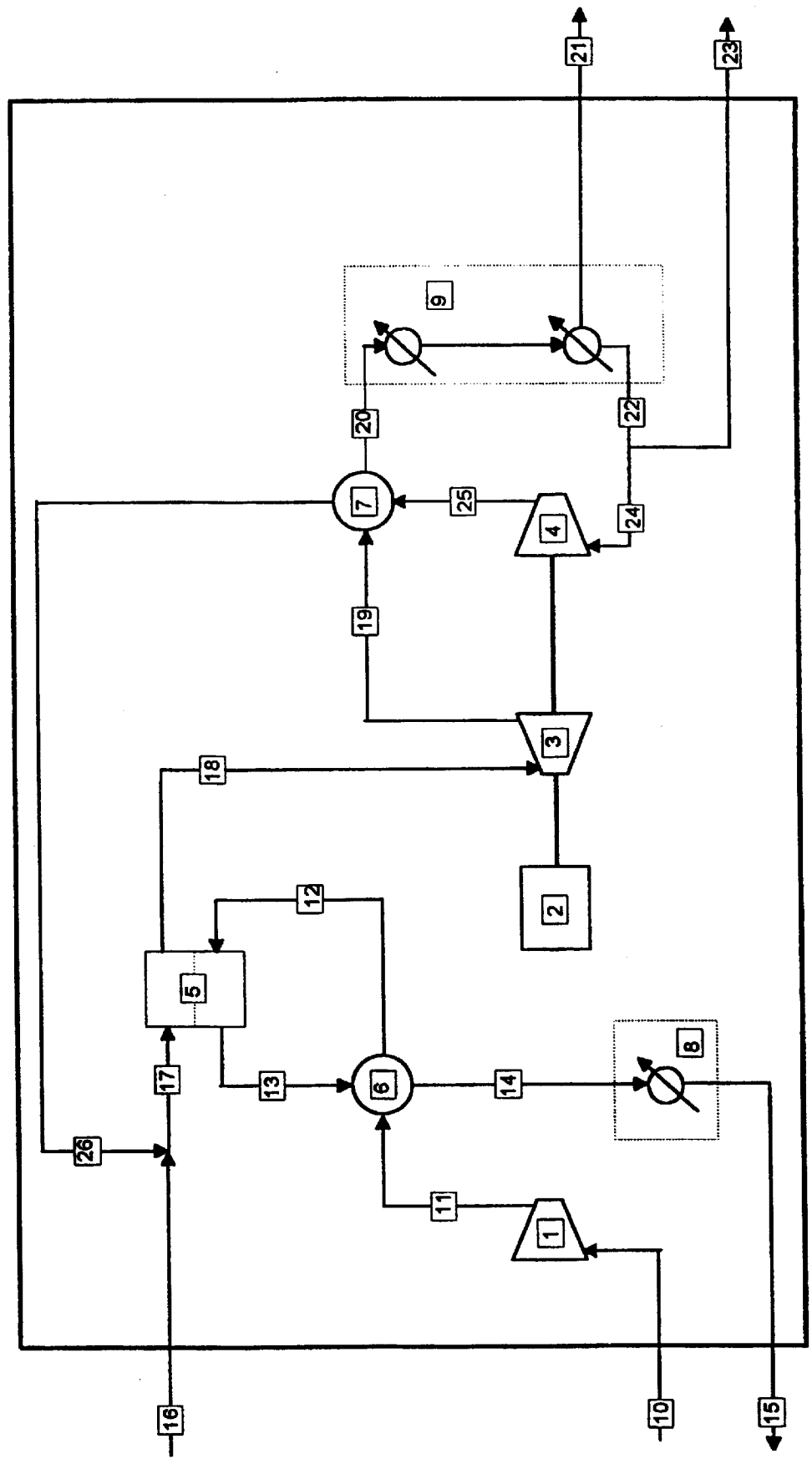
FIG. 1 shows a combined power and heat generation process according to the invention and comprising a gas turbine cycle where part of the heat is recovered as mechanical or electrical power.

FIG. 1 shows a combined power and heat generating process comprising application of an air blower 1 to feed air to a membrane reactor 5 and a gas turbine system, (units 2, 3, 4, 7 and 9), integrated with the said membrane reactor and where the membrane reactor is applied instead of a conventional gas turbine combuster.

Air 10 is fed to heat exchanger 6 by means of blower 1. The hot air (stream 12) is then fed to a membrane unit 5 and oxygen is depleted giving a depleted air stream 13. Stream 13 is heat exchanged with the air stream 11 and heat can be further recovered in unit 8. The cooled nitrogen containing gas (stream 15) is discharged off. Recycled pressurised $CO_2$-containing exhaust gas (stream 26) is mixed with fuel (stream 16) and the mixture (stream 17) is fed to the membrane unit 5 countercurrent to the air stream 12 and the fuel is reacted with oxygen on the membrane surface which is coated with an oxidation catalyst. The hot exhaust gas mixture (stream 18) is expanded in gas turbine expander 3, which is connected to an electrical power generator 2, and the resulting stream 19 is then heat exchanged in a recuperator 7 with recycled compressed exhaust gas (stream 25).

The exhaust gas stream 20 leaving recuperator 7 is fed to heat recovery unit 9 and condensed water is separated off as stream 21. Thereafter a part of the exhaust gas (stream 23) containing a high concentration of $CO_2$ is purged off.

The rest of the cooled exhaust gas stream 24 is compressed in compressor 4 and the resulting stream 25 is further pre-heated in recuperator 7 before being mixed with fuel (stream 16) and further added to the membrane reactor 5.

Figure 2:
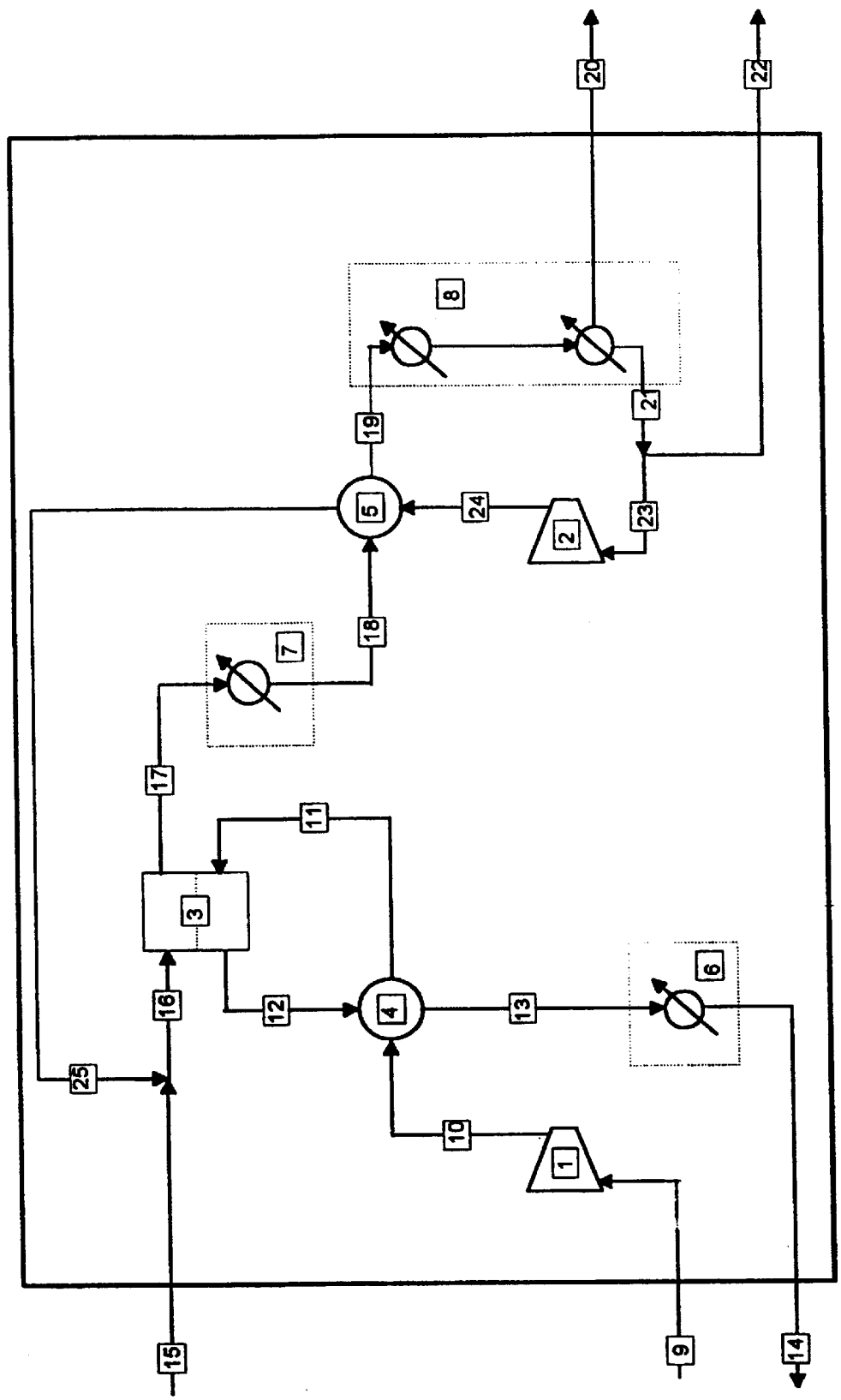
FIG. 2 shows a heat generating process according to the invention operated at near atmospheric pressure.

FIG. 2 shows a heat generating process comprising application of a first air-based heat recovery system (units 1, 4, part of unit 3 and 6) which are integrated with a mixed conducting membrane unit 3 for supplying oxygen to a heat generating system (units 2, 5, 7, 8 and part of unit 3) comprising a nearly nitrogen free combustion process.

Air stream 9 is fed to heat exchanger 4 by means of blower 1. The hot air stream 11 is then fed to a membrane unit 3 and oxygen is depleted giving a depleted air stream 12 which is heat exchanged with the air stream 10. Heat can be further recovered in unit 6. The cooled nitrogen containing gas (stream 14) is discharged off. Recycled pressurised $CO_2$-containing gas (stream 25) is mixed with fuel stream 15 and the mixture 16 is fed to the membrane unit countercurrent to the air stream 11 and the fuel is reacted with oxygen on the membrane surface which is coated with an oxidation catalyst. The hot gas mixture (stream 17) is fed to heat recovery system 7 and the resulting stream 18 is further heat exchanged in heat exchanger 5 with recycled gas (stream 24).

The gas stream 19 leaving heat exchanger 5 is fed to a heat recovery system 8 and condensed water 21 is separated off. Thereafter a part of the gas (stream 22) containing a high concentration of $CO_2$ is purged off.

The rest of the cooled gas stream 23 is recycled by means of blower 2 and the resulting stream 24 is further pre-heated in heat exchanger 7 before being mixed with fuel (stream 15) and further added to the membrane reactor 3.

EXAMPLE 1

This example shows a power generation process as described in FIG. 1.

Air (10) is fed to heat exchanger 6 by means of a blower 1. The hot air (stream 12) is then fed to a membrane unit (5) and oxygen is depleted off giving a depleted air stream (13). The stream 13 is heat exchanged with the air stream 11 and heat can further be recovered in unit 8. The said gas contain less than 3% oxygen which allow for application in different chemical processes, e.g. for purging purposes. The air stream 12 was heated to about 500–1000° C. in the membrane burner by heat exchanging with hot combusted fuel. Since no fuel is added to the air stream, 100% removal of $CO_2$ from the power plant is easily achieved.

Recycled pressurised $CO_2$-containing exhaust gas (stream 26) is mixed with fuel (16) and the mixture is fed to the membrane unit (5) countercurrent to the air stream (12) and the fuel is reacted with oxygen on the membrane surface which is coated with an oxidation catalyst. The hot exhaust gas mixture at approximately 1000 to 1300° C. (stream 18) is expanded to near atmospheric pressure in the expander 3, which is connected to an electrical power generator 2, and the resulting stream (19) is then heat exchanged in a recuperator (7) with recycled compressed exhaust gas (stream 25).

The high heat capacity of carbon dioxide compared to nitrogen gives a higher temperature of the exhaust gas leaving the expander than in an air blown gas turbine system. Further the compression of recycled $CO_2$-containing exhaust gas will give a lower temperature than the compression of air to the same pressure. This will allow for application of a recuperator at pressure ratios up to at least 30.

Pre-heating of recycled compressed $CO_2$-containing gas in a recuperator according to FIG. 1 will increase the efficiency of the power plant.

The exhaust gas stream 20, leaving recuperator 7 is fed to the heat recovery system 9 and condensed water stream 21 is separated off. Thereafter 3–20% of the exhaust gas (stream 23) containing a high concentration of $CO_2$ is purged off. The rest of the cooled exhaust gas stream 24 is compressed in compressor 4 and the resulting stream 25 is further pre-heated in recuperator 7 before being mixed with fuel (stream 16) and further added to the membrane reactor 5.

The $CO_2$-containing stream 23 contains an insignificant amount of oxygen and the gas could thus be used for enhanced oil and natural gas recovery without further treatment. Stream 23 may contain minor amounts of partially oxidised components. If desired, these components could be oxidised in a catalytic reactor by addition of an oxidant.

In the process according to FIG. 1, 100% of the $CO_2$ generated in the combustion process, can be recovered as a high concentrated $CO_2$-containing exhaust gas. The said exhaust gas, which is purged off, may contain an insignificant amount of oxygen and $NO_x$ and can further be applied for enhanced oil and natural gas recovery without further treatment, or the said gas may be injected to a geological formation for long term deposition.

Known methods are producing exhaust gases containing less than approximately 10% $CO_2$ which require application of an expensive, voluminous and heavy $CO_2$-separation plant if e.g. deposition of $CO_2$ is essential. In order to remove $NO_x$ in these known processes a separate expensive catalytic system has to be installed. Compared to known methods comprising supply of pure oxygen to recycled exhaust gas, the present invention will both increase the power efficiency of the plant and substantially reduce the cost of generation and supply of oxygen to the combustion process. Since no pure or concentrated oxygen streams are generated, serious risks due to handling of pure oxygen will be avoided. Air can be supplied to the combustion process at near atmospheric pressure. The mixed conducting membrane reactor provides a constant low partial pressure of oxygen on the oxidation side (combustion side) and allow oxygen to be transported from air at low pressure to the combustion process at high pressure saving compression of the oxygen used in the combustion process. Compared to conventional gas turbine power plants this way may allow for increased fuel efficiency.

EXAMPLE 2

This example shows a power generating process as described in FIG. 2.

Air (stream 9) is fed to heat exchanger 4 by means of blower 1. The hot air (stream 11) is then fed to a membrane unit 3 and oxygen is depleted giving a depleted air stream 12. Stream 12 is heat exchanged with the air stream 10 and heat can be further recovered in unit 6. Cooled oxygen depleted air (stream 14) is discharged off. The said gas may contain less than 3% oxygen which allow for application in different chemical processes, e.g. for purging purposes.

The air stream 11 can be heated to about 400–1000° C. in the membrane burner by heat exchanging with hot combusted fuel. Since no fuel is added to the air stream, 100% removal of $CO_2$ from the heat generating plant is easily achieved.

Recycled pressurised $CO_2$-containing gas (stream 25) is mixed with fuel (stream 15) and the mixture (stream 16) is fed to the membrane unit 3 countercurrent to the air stream 11 and the fuel is reacted with oxygen on the membrane surface which is coated with an oxidation catalyst. The hot gas mixture at approximately 500 to 1300° C. (stream 17) is fed to heat recovery system 7 and the resulting stream 18 is further heat exchanged in heat exchanger 5 with recycled gas (stream 24).

The gas stream 19, leaving heat exchanger 5 is fed to a heat recovery system 8 and condensed water stream 21 is separated off. Thereafter 3 to 20% of the gas (stream 22) containing a high concentration of $CO_2$ is purged of.

The rest of the cooled gas stream 23 is recycled by means of a blower 2 and the resulting stream 24 is further preheated in heat exchanger 7 before being mixed with fuel (stream 15) and further added to the membrane reactor 3.

The $CO_2$-containing stream 23 contains a not significant amount of oxygen and the gas could thus be used for enhanced oil and natural gas recovery without further treatment or it can be injected to a geological formation for long term deposition or it can be applied in different chemical processes.

Stream 22 may contain minor amounts of partially oxidised components. If desirable these components could be oxidised in a catalytic reactor by addition of an oxidant.

In the process according to FIG. 2, 100% of the $CO_2$ generated in the combustion processes, can be recovered as a high concentrated $CO_2$-containing gas at atmospheric pressure. The said gas, containing a not significant amount of oxygen or $NO_x$, may be injected to a geological formation for long term deposition. The process according to FIG. 2 can be applied for generation of heat in different chemical processes where removal of $CO_2$ is essential and could substantially reduce the cost of such removal compared to other known methods. The method saves $NO_x$-reduction equipments, too. The method according to the invention could e.g. be applied in processes comprising units like column reboilers, fractionating-column feed preheaters, reactor-feed preheaters, steam boilers and heated reactors.

The fuel added to the process is natural gas, methanol synthesis gas comprising hydrogen and carbon monoxide, refinery fuel gas containing mixed hydrocarbons or other combustible gas mixtures.

By the present invention the inventors has arrived at a flexible power and/or heat generation process comprising an improved method for reducing the emissions of $CO_2$ and oxides of nitrogen to the atmosphere from the exhaust gas by generation of an exhaust gas containing a high concentration of carbon dioxide and a not significant concentration of nitrogen oxides. The exhaust gas is suitable for direct use in different processes or for injection and deposition or for enhanced oil and natural gas recovery. Exhaust gas consisting of more than 95% $CO_2$ can be generated without significant loss in the efficiency of the power or heat generation process.

This is obtained by application of a mixed oxygen ion and electron conducting membrane reactor instead of a conventional burner or combuster. Further the inventors found to applicate recycled carbon dioxide or a mixture of carbon dioxide and water, e.g. part of the exhaust gas, from the combustion process as a coolant in membrane reactor. Carbon deposition on the second surface (the oxidation side) can be avoided by properly selecting of catalyst material and by properly adjusting the ratio between fuel and recycled $CO_2$ and $H_2O$ containing exhaust gas.

By applying the membrane reactor oxygen could be recovered and reacted with a fuel without intermediate cooling and recompression of the oxygen. An additional advantage is that the operation pressure on the feed side of the membrane reactor can be lower or much lower than the operation pressure on the oxidation side of the membrane burner because the partial pressure of oxygen on the oxidation side will be very low due to the oxidation reactions. This implies that oxygen can be supplied to a high pressure oxidation process without a first compression of air and the result of that is increased efficiency of the power and heat generation compared to other known methods.

The oxygen depleted air leaving the feed side of the membrane reactor contains less than 3% oxygen and no combustion products, which allow for application in different chemical processes, e.g. for purging purposes.

The described application of mixed conductive membranes can in principle be used in the same way for several types of power or heat generation processes e.g. in Combined Cycle Power Plants or in Integrated Gasification and Combined Cycle power plants or in any processes comprising combustion of a fuel.

What is claimed is:

1. A process for generating heat or power, or both, comprising:
   providing a membrane reactor, the membrane reactor comprising a first feed side surface and a second oxidation side surface, the first and second surfaces being connected by a mixed oxygen ion and electron conducting membrane, wherein oxygen contacting the first feed side surface is reduced to oxygen ions, wherein the oxygen ions are conducted through the conducting membrane to the second oxidation side surface, and wherein the oxygen ions are oxidized to oxygen at the second oxidation side surface,
   supplying an air stream to the first feed side surface of the membrane reactor, wherein oxygen contained in the air stream is reduced to oxygen ions, which oxygen ions are conducted by the conducting membrane to the second oxidation side surface of the membrane reactor,
   mixing a carbon containing fuel and a recycled $CO_2$—$H_2O$ containing exhaust gas,
   supplying the mixture of carbon containing fuel and recycled $CO_2$—$H_2O$ containing exhaust gas to the second oxidation side surface of the membrane reactor, wherein the mixture is contacted with the oxygen ions on the second oxidation side surface to oxidize the oxygen ions to oxygen,
   causing a combustion of the oxygen and mixture of carbon containing fuel and recycled $CO_2$—$H_2O$ containing exhaust gas, which combustion generates a $CO_2$—$H_2O$ containing exhaust gas, and
   feeding the $CO_2$—$H_2O$ containing exhaust gas to a recovery system for heat or power, or both, thereby generating heat or power, or both.

2. The process according to claim 1, wherein after feeding the $CO_2$—$H_2O$ containing exhaust gas to the recovery system, the exhaust gas is compressed and injected into an oil and gas reservoir for enhancing oil recovery.

3. The process according to claim 1, wherein after feeding the $CO_2$—$H_2O$ containing exhaust gas to the recovery system, the exhaust gas is compressed and injected into a geological formation.

4. The process according to claim 1, wherein the air stream is heated before being supplied to the first feed side surface of the membrane reactor.

5. The process according to claim 1, wherein after supplying the air stream to the first feed side surface of the membrane reactor, the air stream is depleted of oxygen by contact with the first feed side surface, and the oxygen depleted air stream is passed through a heat recovery system to recover heat from the oxygen depleted air stream.

6. The process according to claim 5, wherein the air stream is heated before being supplied to the first feed side surface of the membrane reactor by recovering heat from the oxygen depleted air stream using the heat recovery system.

7. The process according to claim 4, wherein the air stream is heated to about 500–1,000° C.

8. The process according to claim 1, wherein the $CO_2$—$H_2O$ containing exhaust gas is fed to an expander, which is connected to an electrical power generator, for generation of power.

9. The process according to claim 8, wherein after being fed to the expander, the $CO_2$—$H_2O$ containing exhaust gas is fed to a heat recuperator to recover heat from the exhaust gas.

10. The process according to claim 1, wherein the $CO_2$—$H_2O$ containing exhaust gas is fed to a heat recovery system, for generating heat from the exhaust gas.

11. The process according to claim 1, wherein the $CO_2$—$H_2O$ containing exhaust gas is fed to a heat exchanger, to transfer heat from the exhaust gas to another gas stream.

12. The process according to claim 1, wherein the $CO_2$—$H_2O$ containing exhaust gas is recycled by mixing with fuel before being supplied to the first feed side surface of the membrane reactor.

13. The process according to claim 1, wherein the oxygen which is produced at the second oxidation side surface is neither cooled nor compressed before combustion with the fuel.

* * * * *